Figure 1:
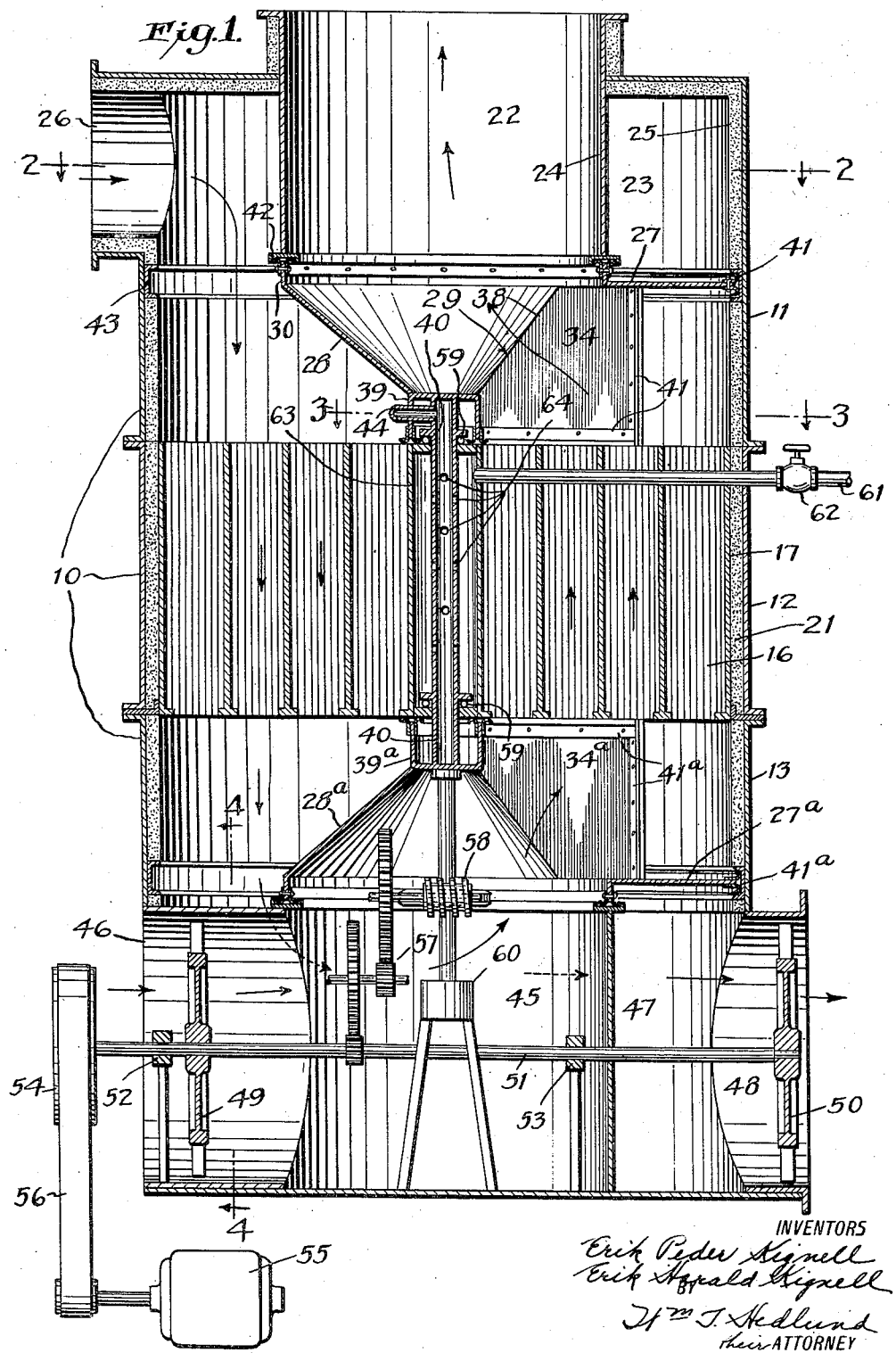

May 17, 1932.  E. P. KIGNELL ET AL  1,858,508
REGENERATIVE HEATING DEVICE
Filed Oct. 9, 1925   4 Sheets-Sheet 1

INVENTORS
Erik Peder Kignell
Erik Harald Kignell
Wm J. Hedlund
their ATTORNEY

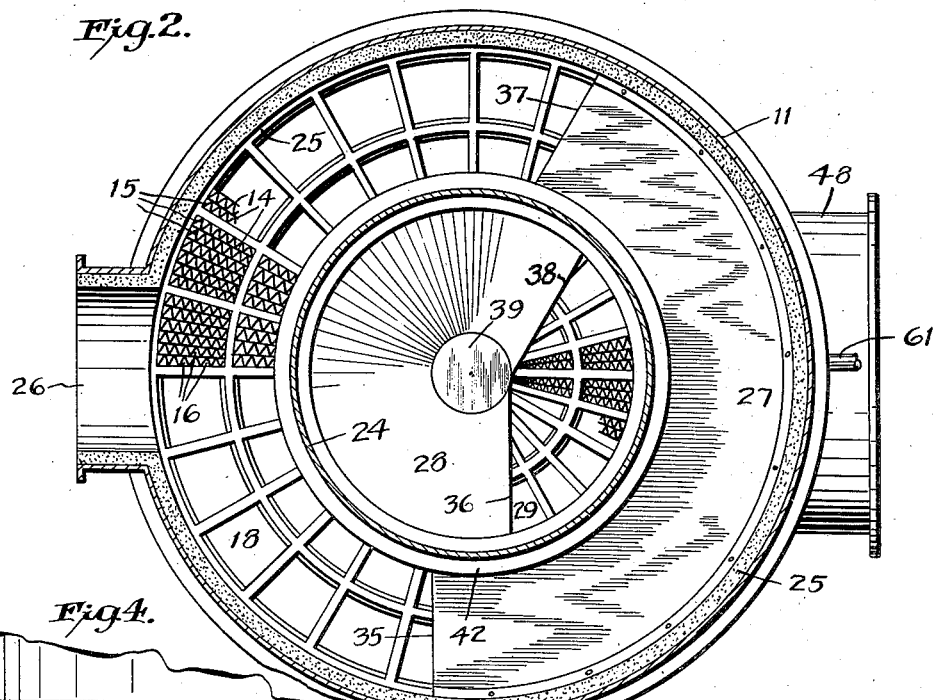
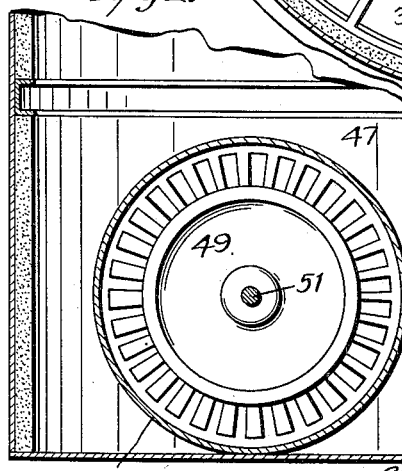
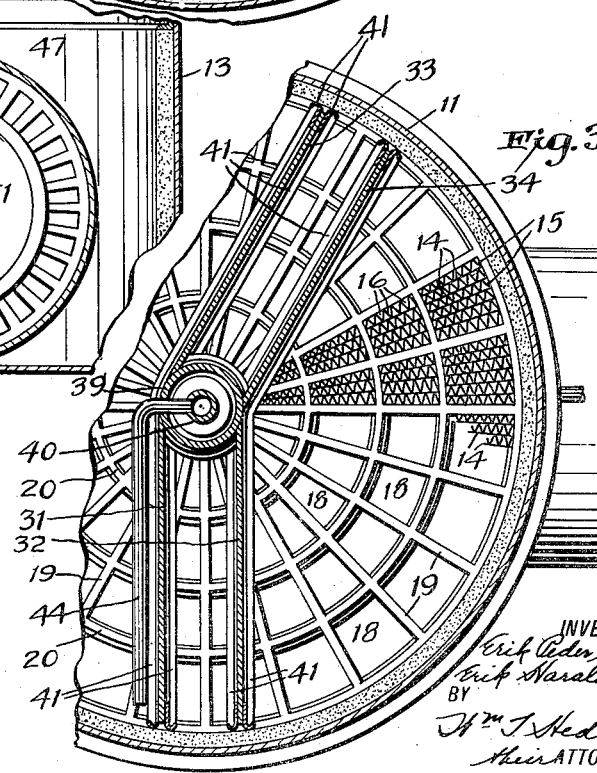

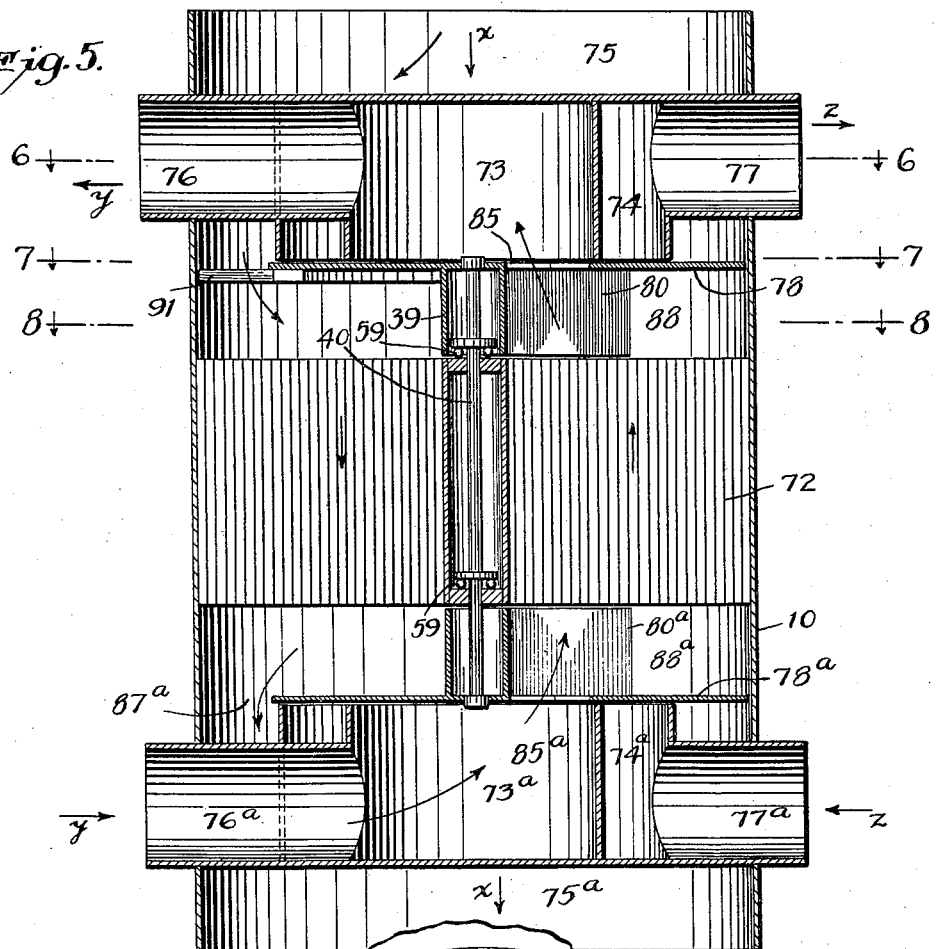
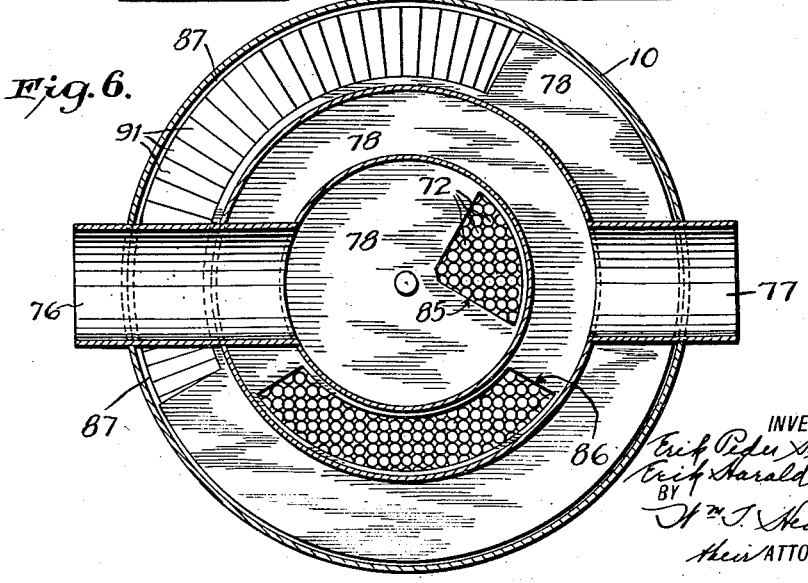

May 17, 1932.  E. P. KIGNELL ET AL  1,858,508
REGENERATIVE HEATING DEVICE
Filed Oct. 9, 1925  4 Sheets-Sheet 4
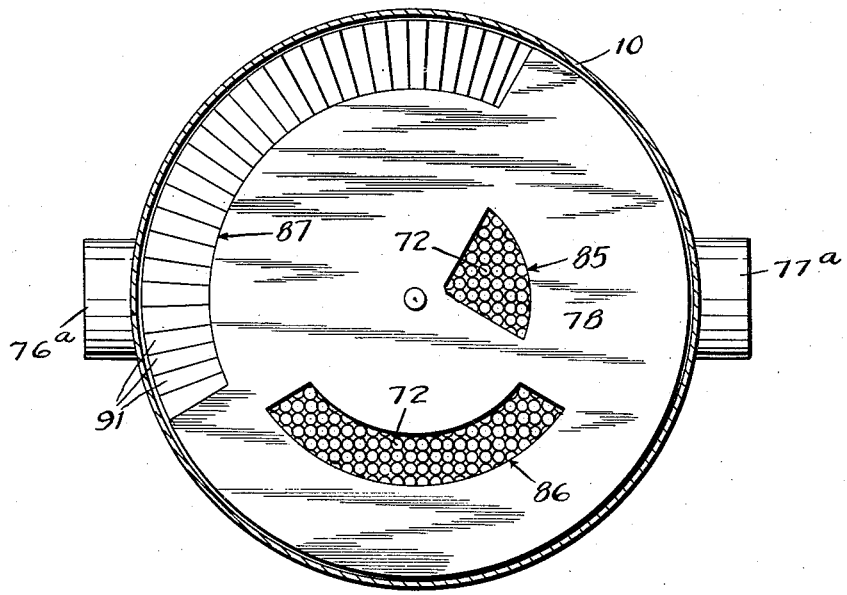
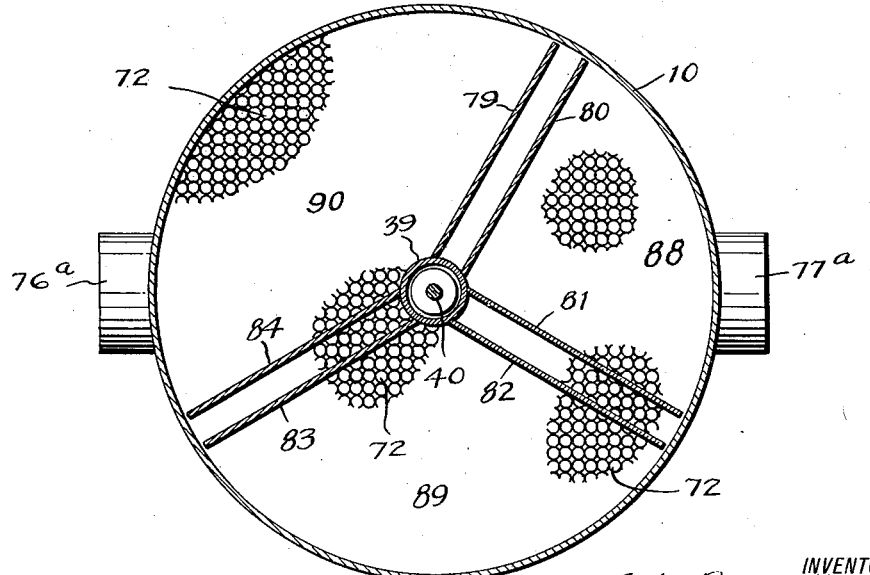

Patented May 17, 1932

1,858,508

UNITED STATES PATENT OFFICE

ERIK PEDER KIGNELL, OF STOCKHOLM, SWEDEN, AND ERIK HARALD KIGNELL, OF FAYMOUREAU, FRANCE, ASSIGNORS TO AKTIEBOLAGET LJUNGSTROMS ANGTURBIN, OF STOCKHOLM, SWEDEN, A CORPORATION OF SWEDEN

REGENERATIVE HEATING DEVICE

Application filed October 9, 1925, Serial No. 61,617, and in Sweden March 14, 1925.

Our invention relates to regenerative heating devices and has for one purpose to provide a novel construction of such device wherein the regenerative material can be held stationary and only light parts are moved, preferably by rotation, and a continuous operation is obtained with high efficiency.

Our invention, amongst other features, includes a novel supply and discharge arrangement for fluid passing through a regenerative preheater.

The various objects, advantages, modes of operation and constructional features of our invention will most readily be understood by reference to the accompanying drawings and the following description of the embodiments shown thereon.

In the accompanying drawings: Fig. 1 is a cross-sectional view of one embodiment of our invention; Fig. 2 is a section taken on line 2—2, Fig. 1; Fig. 3 is a section on line 3—3, Fig. 1; Fig. 4 is a section on line 4—4, Fig. 1; Fig. 5 is a cross-sectional view of a second embodiment of our invention; Fig. 6 is a section on line 6—6, Fig. 5; Fig. 7 is a section on line 7—7, Fig. 5 and Fig. 8 is a section on line 8—8, Fig. 5.

Referring more particularly to the embodiment shown in Figs. 1, 2, 3 and 4, numeral 10 designates a main casing divided into an upper section 11, an intermediate section 12 and a lower section 13. The intermediate section contains the regenerative material which serves to absorb heat by rise of temperature and to give off heat by drop of temperature, the absorption and rejection of heat taking place alternately and continuously while the apparatus is in operation in manner presently to be described. As regenerative material, various substances may be used and, by way of example, we have shown alternate straight and corrugated plates 14 and 15 which form a honeycomb structure comprising a large number of straight passages 16 between them extending the full length of the intermediate section 12. The regenerative material is placed in a cylindrical drum 17 of a length equal to the length of section 12, which drum is divided into a series of compartments 18 by means of radial and concentric walls 19 and 20, each of these compartments being filled with regenerative material. The regenerative material remains stationary, the cylinder 17 being secured to casing 12 by any suitable means. Between casing 12 and cylinder 17, we have shown heat insulating material 21.

The upper and lower sections 11 and 13 may be considered as each made up of parts, one part comprising concentrically arranged supply and discharge channels and the other part comprising a valvular structure for continuously effecting communication between the supply and discharge channels and various regenerative passages 16 in succession while preventing mixture of gases passing through the exchanger, the arrangement being such that there is continuous flow through each of the channels and through a portion of the passages for one gas and through another portion for another gas. In general, sections 11 and 13 are counterparts wherefore the upper section will be described in detail and the construction of the lower section will be for the most part obvious from the description of the upper section.

Section 11 includes an inner cylindrical discharge channel 22 through which gases leave the exchange apparatus and an annular channel 23 which serves as a supply channel for the exchange apparatus. The outer walls 24 and 25 of these channels are concentric and co-axial with cylinder 17. Gas enters chamber 23 through opening 26.

Communication between channel 23 and passages 16 is controlled by a rotatable plane plate 27 which has an arcuate shape determined by two radii and two concentric arcs, leaving a portion of the lower end of channel 23 open to communication with passages 16. This can be readily seen from Fig. 2.

Communication between channel 22 and passages 16 is controlled by a rotatable cone shaped member 28 having a substantially sector shaped opening 29 in the side of the same. The base of the cone is open to channel 22. The cone member 28 and plate 27 are secured together, each being integral with a ring 30 of cylindrical form and of complete circumferential formation.

Attached to the cone member and plate 27 are vertically arranged plates 31, 32, 33, 34 which are of the shape of rectangles with one corner cut off. The position of these plates can be determined by comparison of Figures 2 and 3. Plate 31 lies under and adjacent the edge 35 of plate 27. Plate 32 is under and adjacent edge 36 of cone shaped member 28. Plate 33 is under and adjacent edge 37 of plate 27. Plate 34 is under and adjacent edge 38 of cone 28. Without these vertical plates there would be direct communication between chambers 22 and 23 but the plates prevent such communication and, furthermore, by having two plates in parallel, spaced to such an extent that each of the channels 16 on any radial line are completely shut off from communication with either chamber 22 or 23 when the two plates cross the radial line, leakage by way of channels 16 from one gas channel to another can be prevented. Cone shaped member 28 and vertical plates 31, 32, 33 and 34 are attached to a rotatable cap 39 which is integral with a hollow shaft 40.

Around all the edges of the movable parts 27, 28, 30, 31, 32, 33, 34, 39 and 40 are placed tightening strips 41 which are small thin metal pieces, attached to a movable part by one edge and curved along the opposite edge so as to present a tangential surface to the stationary part along which it slides. Preferably double strips are employed one on each side of the plate. On the upper edge of ring 30 the strips slide in a channel 42 which is secured to the wall of chamber 22. On the outer edge of plate 27, the strips slide in a channel 43 set into the main casing. The strips at the bottom of plates 31, 32, 33 and 34 slide over the tops of the regenerative material. The strips on the vertical outer edges of plates 31, 32, 33 and 34 slide over the inner surface of the main casing. The plate 27, cone 28, walls 31, 32, 33 and 34 and the tightening strips constitute what is herein termed a valvular device.

In order to clean the passages 16, we employ a horizontal pipe 44 which is in communication with the inside of hollow shaft 40 and extends parallel to one of the vertical walls. This pipe is provided with a series of holes so arranged that a cleaning medium such as air or steam supplied to the same will pass through the holes and into passages 16. This soot blower pipe 44 rotates with the valvular device. The cleaning medium is admitted through pipe 61 controlled by valve 62 and enters the stationary core 63 of cylinder 17, thence through holes 64 in shaft 40 and into pipe 44.

As before stated the lower part of the casing is substantially a counterpart of the upper. A central chamber 45 serves as an inlet channel for those gases which leave through channel 22. Access to chamber 45 is had through a circular channel 46. The chamber 47 extending around chamber 45 except where channel 46 passes through the same serves as an outlet channel for the gases passing in through opening 26. From chamber 47 the gases pass out through channel 48. Fig. 4 taken on line 4—4, Fig. 1 shows how the channel 46 passes through chamber 47 and, with the position of parts shown in Fig. 1, there is communication between channel 48, chamber 47 and the passages 16 on the left hand side of the exchange apparatus as shown on the drawings.

A valvular device similar to the upper one controls communication between chamber 48 and certain of passages 16 and between chamber 45 and other passages. The lower valular device has corresponding parts to parts 27, 28, 31, 32, 33, 34, 39 and 41, directly below the upper parts and inverted with respect to the same and designated by like numerals with the letter $a$ attached. For example, plate 34a is directly below plate 34.

Flow of gases is caused by fans 49 and 50 in channels 46 and 48 respectively. The fans are placed on a common shaft 51, bearings for which are diagrammatically indicated by numerals 52 and 53. The shaft 51 is rotated by means of pulley 54, driven by motor 55 through belt 56. Shaft 40 for the valvular devices may be driven from motor 55 as shown, by means of reduction gears 57 and worm drive 58. The shaft 40 may be supported in a number of ways. We have indicated ball bearings at 59 and a lower bearing 60.

The apparatus shown in the above described figures is intended for heating air by means of flue gases. It is for this reason that plates 33 and 34 are arranged at an angle with plates 31 and 32. The volume of air entering a furnace is less than the volume of flue gases leaving a furnace or boiler in a given period of time and the vertical partitioning plates are therefore placed with respect to each other so that the cross-sectional area of flow for air through the regenerative material is less than the cross-sectional area of flow of flue gases.

Air is forced through channel 46 by fan 49 in the direction shown by the arrows and enters chamber 45 whence it passes through the opening in cone 28a, forward of plate 34a as seen in Fig. 1 and into passages 16 on the right hand side of the apparatus as shown, absorbing heat from the metal surrounding passages 16. From passages 16 the air passes into the space between walls 32 and 34 and through opening 29 in cone 28 and into channel 22.

Flue gases enter through opening 26 and down through the left hand side of the regenerative material as shown since the plate 27 is at the right as shown in Figs. 1, 2 and 3. The gases then pass through those compartments 18 and the regenerative material therein which can be seen through the bottom of channel 23 in Fig. 2. Thence they pass to the left of lower cone member 28a and around chamber 45 and channel 46 as shown by dotted arrows and out through channel 48. On passage through passages 16, the gases heat the metal regenerative material surrounding them.

As the valvular devices are rotated, passages 16 which previously served as paths for flue gases change their communication and become paths for cold air. Imagine, for example, that the valvular devices are rotated through an angle of 180°. Passages 16 at the right of the apparatus as shown are then in communication with channel 23 and chamber 47 whereas passages 16 at the left as shown are then in communication with channel 22 and chamber 45. The regenerative material at the left which previously was heated by flue gases, now serves to heat cold air and the regenerative material at the right which previously was cooled by air now is heated by flue gases. It will be evident from the above description that a continuous heating of air and cooling of gases takes place, while the heavy regenerative material is kept stationary and only relatively light members are moved, while an effective separation of gas and air from each other is obtained.

In Figs. 5, 6, 7 and 8 we have shown a second modification wherein three fluids pass through the same heat exchange apparatus and wherein the valvular devices are simplified, this modification being illustrated more diagrammatically than the previous one. Numeral 10 designates the main cylindrical casing, as before, in which the regenerative material is placed, which, in this case consists of a series of tubes 72 of equal length and through and along the outside of which fluids may pass. Above the regenerative material are three channels or chambers 73, 74 and 75 which are in part concentric and co-axial with casing 10. Chamber 73 communicates with channel 76 and chamber 74 communicates with channel 77.

The valvular device in this case consists of a plane plate 78 which takes the place of both the plate 27 and cone member 28 in the embodiment previously described, to which plate (78) is attached a series of vertical plates 79, 80, 81, 82, 83 and 84 (see Fig. 8) of rectangular shape. Plane plate 78 has three openings, 85, 86 and 87 in the same, of such size and position that vertical upward projections of the edges of the openings pass through different chambers; that is one opening, 85, affords communication from the space below plate 78 only (leakage excepted) with chamber 73; a second opening 86, affords communication from the space below plate 78 only with chamber 74; and a third opening 87, affords communication from below plate 78 only with chamber 75. Furthermore the openings are so formed that no parts of any two openings are in the same radial line. On certain radial lines lying between parallel vertical plates, there are no openings. As will be seen by comparing Figs. 7 and 8, plates 80 and 81 are directly under the radial edges of opening 85; plates 82 and 83 are directly under the radial edges of opening 86; and plates 79 and 84 are directly under the radial edges of opening 87. Opening 85 and chamber 73 therefore have communication only with the sector shaped space 88 between plates 80 and 81 and the tubes opening into the same. Opening 86 and chamber 74 have communication only with sector shaped space 89 between plates 82 and 83 and the tubes opening into the same. Opening 87 and chamber 75 have communication only with sector shaped space 90 between plates 84 and 79 and the tubes opening into the same. Thus each of chambers 73, 74 and 75 have communication with different passages through the regenerative material at any one time and the particular passages with which each has communication can be altered by rotation of plate 78.

Plates 79, 80, 81, 82, 83 and 84 are attached to a cylindrical cap 39 which serves to prevent mixture of fluids at the center of the apparatus. The valvular device is supported on shaft 40 and mounted in bearings 59.

Rotation of the valvular device is in this case caused by a series of blades 91 arranged in opening 87 at an angle to plate 78, attached to plate 78 and moved by the fluid passing between the same.

The lower part of the apparatus being a counterpart of the upper, its construction will be readily apparent from the above description. Corresponding parts to those in the upper part are marked with the same numeral and the letter a.

To illustrate the operation of the apparatus, assume that a hot fluid $x$ to be cooled enters chamber 75 and two different fluids $y$ and $z$ to be heated enter channels 76a and 77a respectively. In the position of parts shown in Fig. 5, fluid $x$ passes through opening 87, between blades 91, then through and around tubes 72 on the left of the apparatus as shown. Thence fluid $x$ passes through opening 87a in lower plate 78a out at the bottom of the apparatus.

Fluid $y$ entering channel 76a passes into chamber 73a and through opening 85a in lower plate 78a, thence through tubes 72 at the right of the apparatus as shown and into space 88, through opening 85, through chamber 73 and out through channel 76.

Fluid $z$ entering channel 77a passes into chamber 74a, thence through an opening in lower plate 78a directly below opening 86, through and around tubes 72 in the front part of the apparatus as shown, thence into space 89, through opening 86 in plate 78, through chamber 74 and out through channel 77. As the valvular devices which are attached to the common shaft 40 rotate due to the action of fluid $x$ against blades 91, the tubes 72 at the left which previously were in communication with chambers 75 and 75a, are brought into communication with chambers 73 and 73a and with chambers 74 and 74a in succession so that the heat absorbed by the tubes 72 at the left, on passage of fluid $x$ through and by them, later is given off to fluids $y$ and $z$.

Thus this apparatus operates similarly to that previously described to continuously abstract heat from one fluid and give off heat to another fluid.

Various changes in construction and arrangement falling within the scope of the invention of parts will be obvious to those skilled in the art, and any dimensions of openings and parts are obviously within the invention. Various types of fans or other means may be used to force the fluids through the heat exchange apparatus. Various types of bearings and supports for the valvular device are possible without departing from the scope of the invention. Various kinds and arrangements of regenerative material may be used. The regenerative apparatus may be arranged either vertically or horizontally.

As herein used the word "continuous" as applied to movement or rotation means "continuous during such time as the apparatus as a whole is in operation".

What we claim is:—

1. A regenerative heating device comprising a stationary frame-work, compartments in said frame-work, regenerative material in said compartments, a stationary supply channel and a stationary discharge channel for a fluid to be heated, a stationary supply channel and a stationary discharge channel for a fluid giving off heat, a valvular device comprising a conical member and a plate, each provided with openings controlling communication between the compartments and the channels, and means to prevent mixture of fluids, said valvular device in a given position controlling communication between the channels for the fluid to be heated and certain compartments and controlling communication between the channels for the fluid giving off heat and other compartments than said certain compartments, and means to rotate said valvular device.

2. A regenerative heating device comprising a stationary frame-work, compartments in said frame-work, regenerative material in said compartments, a stationary supply channel and a stationary discharge channel for a fluid to be heated, a stationary supply channel and a stationary discharge channel for a fluid giving off heat, a valvular device comprising a conical member and a plate, each provided with openings controlling communication between the compartments and the channels, and plates situated between said openings to prevent mixture of fluids, said valvular device in a given position controlling communication between the channels for the fluid to be heated and certain compartments and controlling communication between the channels for the fluid giving off heat and other compartments than said certain compartments, and means to rotate said valvular device.

3. A regenerative heating device comprising a stationary cylindrical casing, a cylindrical frame-work in said casing, the ends of said frame-work determining planes, said frame-work having compartments in the same, regenerative material in said compartments having passages through the same, a supply channel and a discharge channel for a fluid to be heated, said channels being situated at opposite ends of said frame-work, a supply channel and a discharge channel for a fluid giving off heat also situated at opposite ends of said frame-work, a rotatable circular valvular device mounted co-axially with said frame-work and said casing and comprising a portion having openings through the same providing communication between said channels and said compartments, any part of one opening being radially displaced from any part of another opening, and plates extending between said portion and the planes of the ends of the frame-work and to the main casing to prevent direct communication between said openings and attached to said portion at points between said openings.

4. A regenerative heating device comprising a stationary cylindrical casing, a cylindrical frame-work in said casing, the ends of said frame-work determining planes, said frame-work having compartments in the same, regenerative material in said compartments having passages through the same, a supply channel and a discharge channel for a fluid to be heated, said channels being situated at opposite ends of said frame-work, a supply channel and a discharge channel for a fluid giving off heat also situated at opposite ends of said frame-work, a rotatable circular valvular device mounted co-axially with said frame-work and said casing and comprising a portion having openings through the same providing communication between said channels and said compartments, any part of one opening being radially displaced from any part of another opening, plates extending between said portion and the planes of the ends of the frame-work and to the main casing to prevent direct communication between said openings and attached to said portion at points between said openings, and tightening means between the rotatable valvular device and the stationary parts.

5. In a regenerative heating device, the combination of regenerative material having passages through the same, and channels for fluids to be heated and giving off heat, of a continuously rotating mechanism to control flow between said channels and passages, a soot blower attached to and movable with said mechanism and having openings directed toward said passages.

6. A regenerative heating device comprising a casing, a framework in said casing, regenerative material in said framework having spaced passages therethrough, a supply channel and a discharge channel for a fluid to be heated, a supply channel and a discharge channel for a fluid to be cooled, valvular mechanism in said casing relatively movable with respect to said framework and including a portion having a plurality of separate openings, and plates on said portion adjacent the edges of said openings and extending between said portion and said regenerative material to prevent direct communication between said openings.

7. A regenerative heating device comprising a cylindrical casing, a framework in said casing, regenerative material in said framework having spaced passages therethrough, a supply channel and a discharge channel for a fluid to be heated, a supply channel and a discharge channel for a fluid to be cooled, valvular mechanism in said casing relatively rotatable with respect to said framework and including a portion having a plurality of separate concentric openings, and plates on said portion adjacent the edges of said openings and extending between said portion and said regenerative material to prevent direct communication between said openings.

8. A regenerative heating device comprising a stationary casing, a framework in said casing, regenerative material in said framework having spaced passages therethrough, channels for fluid to be heated and fluid to be cooled, rotatable valve mechanism for controlling flow between said passages and channels, and means on said valve mechanism operable by fluid pressure to rotate said mechanism.

9. A regenerative heating device comprising a stationary casing, a framework in said casing, regenerative material in said framework having spaced passages therethrough, channels for fluid to be heated and fluid to be cooled, rotatable valve mechanism for controlling flow between said passages and channels and impeller vanes on said valve mechanism operable by fluid pressure to rotate said mechanism.

10. A regenerative heating device comprising a stationary casing, a framework in said casing, regenerative material in said framework having spaced passages therethrough, channels for fluid to be heated and fluid to be cooled, rotatable valve mechanism for controlling flow between said passages and channels, impeller vanes on said valve mechanism operable by fluid pressure to rotate said mechanism, and means for supplying fluid under pressure to said impeller vanes.

11. In a regenerative heating device, regenerative material having passages through the same, channels for fluids to be heated and to be cooled, rotatable valve mechanism for controlling flow between said passages and channels, means including a hollow shaft for rotating said valve mechanism, a soot blower movable with said mechanism and having openings directed towards said passages, and communicating with said hollow shaft, and means for supplying fluid under pressure to said hollow shaft.

12. A regenerative heating device comprising a casing, a framework in said casing, regenerative material in said framework having spaced passages therethrough, channels for fluid to be heated and fluid to be cooled, valve mechanism controlling flow between said passages and said channels, said valve mechanism and said framework being relatively movable, and means on one of said relatively movable elements operable by fluid pressure to affect said relative movement.

In testimony whereof we affix our signatures.

ERIK PEDER KIGNELL.
ERIK HARALD KIGNELL.